US012682102B2

(12) United States Patent
Shemer et al.

(10) Patent No.: US 12,682,102 B2
(45) Date of Patent: Jul. 14, 2026

(54) DATA STORAGE SERVER AND CLIENT DEVICES FOR SECURELY STORING DATA

(71) Applicant: HUAWEI TECHNOLOGIES CO., LTD., Shenzhen (CN)

(72) Inventors: Eli Shemer, Bnei Berak (IL); Rafi Dinari, Bnei Berak (IL); Liang Guo, Shenzhen (CN); Shay Akirav, Bnei Berak (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 18/148,273

(22) Filed: Dec. 29, 2022

(65) Prior Publication Data

US 2023/0144072 A1 May 11, 2023

Related U.S. Application Data

(63) Continuation of application No. PCT/EP2020/068268, filed on Jun. 29, 2020.

(51) Int. Cl.
*G06F 21/62* (2013.01)
*G06F 16/245* (2019.01)
*G06F 21/60* (2013.01)

(52) U.S. Cl.
CPC ........ *G06F 21/6227* (2013.01); *G06F 16/245* (2019.01); *G06F 21/602* (2013.01)

(58) Field of Classification Search
None
See application file for complete search history.

(56) References Cited

U.S. PATENT DOCUMENTS 7,111,005 B1 * 9/2006 Wessman ............ G06F 21/6227
707/999.009
2004/0205048 A1 * 10/2004 Pizzo .................. G06F 16/2358
(Continued)

FOREIGN PATENT DOCUMENTS

| CN | 103248479 A | 8/2013 |
| CN | 107124271 A | 9/2017 |

(Continued)

OTHER PUBLICATIONS

Fernandes et al., "Security issues in cloud environments: a survey," Special Issue Paper, Springer-Verlag Berlin Heidelberg, Total 58 pages (Sep. 28, 2013).

(Continued)

*Primary Examiner* — Nelson S. Giddins
(74) *Attorney, Agent, or Firm* — Leydig, Voit & Mayer, Ltd.

(57) ABSTRACT
A client device configured to store data in a database of a data storage server is provided. The data storage server stores security sensitive data in one or more encrypted data structures of the database. The client device is configured to determine whether data to be stored in the database comprises security sensitive data to be stored in an encrypted data structure of the database and to encrypt this security sensitive data with an encryption key. Furthermore, the client device is configured to provide the data, including the encrypted security sensitive data, and an identifier of the encryption key to the server for storing, based on the identifier of the encryption key, the security sensitive data in the encrypted data structure of the database. According to the present disclosure, the security sensitive data which is already encrypted at the client device improves a secure protection of the data.

22 Claims, 8 Drawing Sheets

(56)            References Cited

U.S. PATENT DOCUMENTS

| | | | | |
|---|---|---|---|---|
| 2004/0255133 A1* | 12/2004 | Lei | .................. | G06F 21/6227 |
| | | | | 713/193 |
| 2009/0077371 A1* | 3/2009 | Powell | .................. | H04L 9/083 |
| | | | | 380/278 |
| 2013/0179684 A1* | 7/2013 | Furukawa | .................. | H04L 9/16 |
| | | | | 713/165 |
| 2017/0344646 A1* | 11/2017 | Antonopoulos | ...... | H04L 63/205 |
| 2019/0013936 A1* | 1/2019 | Murray | .................. | H04L 9/088 |
| 2019/0171846 A1* | 6/2019 | Conikee | .............. | G06F 21/6245 |
| 2020/0195433 A1* | 6/2020 | Collier | .................. | G06F 21/602 |

FOREIGN PATENT DOCUMENTS

| | | | | |
|---|---|---|---|---|
| CN | 108616528 A | 10/2018 | | |
| CN | 109842589 A | 6/2019 | | |
| CN | 110889130 A | 3/2020 | | |
| EP | 2731042 A1 * | 5/2014 | .......... | G06F 16/235 |
| WO | 2007038509 A2 | 4/2007 | | |
| WO | 2018161302 A1 | 9/2018 | | |

OTHER PUBLICATIONS

Bollwein et al., "Keeping Secrets by Separation of Duties While Minimizing the Amount of Cloud Servers," Transactions on Large-Scale-Data-and-Knowledge-Centered Systems XXXVII, Springer, Total 5 pages (Jun. 2018).

Rompay et al., "Multi-user Searchable Encryption in the Cloud," Springer International Publishing Switzerland, Total 18 pages (Sep. 2015).

Chow et al., "Efficient Unidirectional Proxy Re-Encryption," Springer-Verlag Berlin Heidelberg, Total 26 pages (May 2010).

Deshmukh et al., "Transparent Data Encryption—Solution for Security of Database Contents," International Journal of Advanced Computer Science and Applications, vol. 2, No. 3, Total 5 pages (Mar. 2011).

Jacobson, "The Public Key Muddle—How to Manage Transparent End-to-end Encryption in Organizations," Springer Fachmedien Wesbaden, Total 5 pages (Oct. 2015).

Rogaway, "Authenticated-Encryption with Associated-Data," ACM Conference on Computer and Communications Security, Total 30 pages (Sep. 20, 2002).

* cited by examiner

127

| Country | Salary (Encrypted) | Name |
|---|---|---|
| USA | 0x2566A | Brad |
| UK | 0x7843F | Tom |
| France | 0x2572A | Nicolas |
| Israel | 0x2572F | Michael |
| Australia | 0x68932 | James |
| USA | 0x1736C | John |
| UK | 0xCC241 | George |
| Germany | 0xBB256 | Simon |

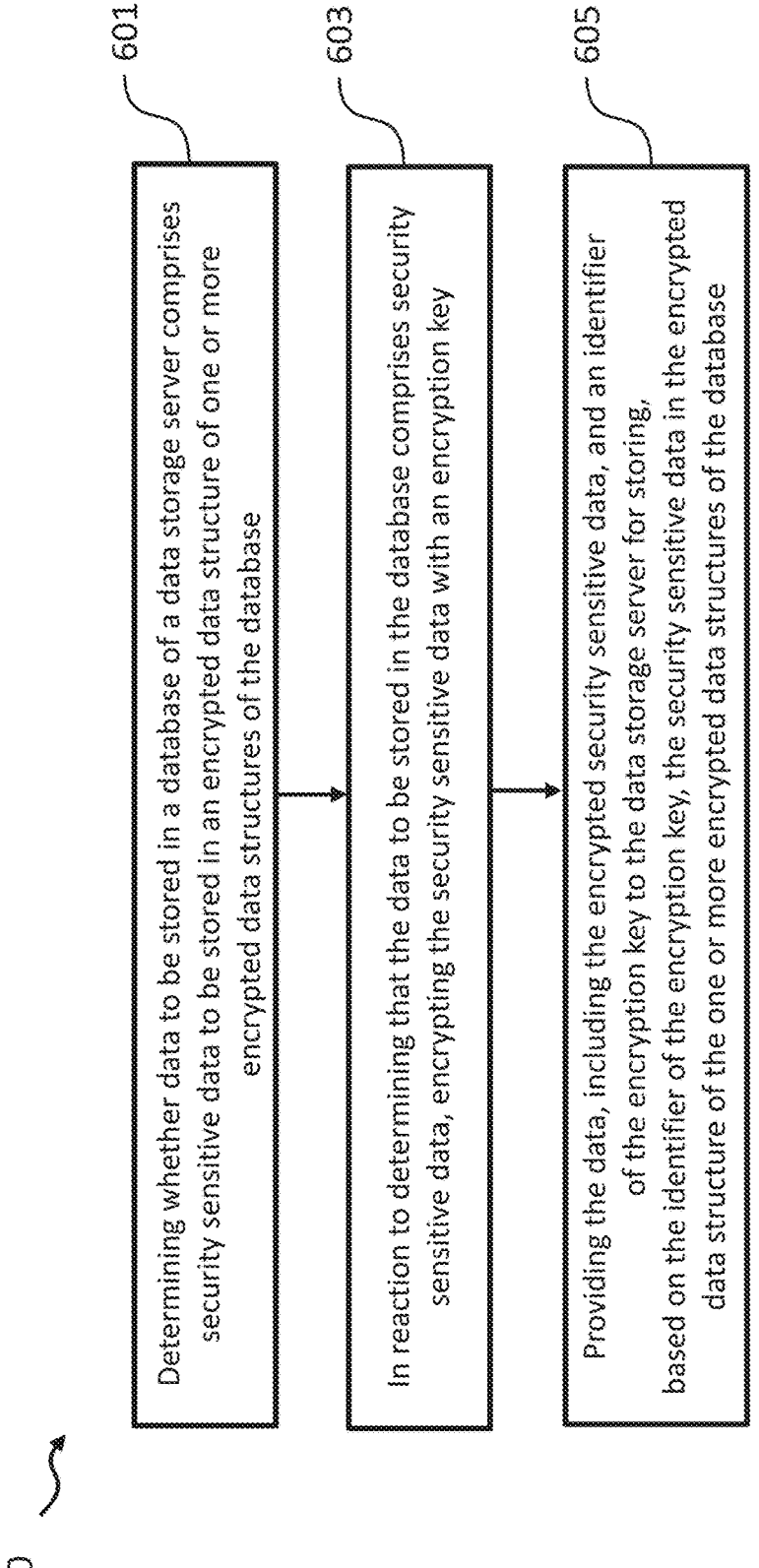

600

601

Determining whether data to be stored in a database of a data storage server comprises security sensitive data to be stored in an encrypted data structure of one or more encrypted data structures of the database

603

In reaction to determining that the data to be stored in the database comprises security sensitive data, encrypting the security sensitive data with an encryption key

605

Providing the data, including the encrypted security sensitive data, and an identifier of the encryption key to the data storage server for storing, based on the identifier of the encryption key, the security sensitive data in the encrypted data structure of the one or more encrypted data structures of the database

Receiving data, including encrypted security sensitive data encrypted with an encryption key, and an identifier of the encryption key from a client device

703

Storing, based on the identifier of the encryption key, the security sensitive data in an encrypted data structure of one or more encrypted data structures of the database

DATA STORAGE SERVER AND CLIENT DEVICES FOR SECURELY STORING DATA

CROSS-REFERENCE TO RELATED APPLICATIONS

This application is a continuation of International Application No. PCT/EP2020/068268, filed on Jun. 29, 2020, the disclosure of which is hereby incorporated by reference in its entirety.

TECHNICAL FIELD

The present disclosure relates to data storage systems. Embodiments of the present disclosure provide client devices and data storage servers for securely storing security sensitive data.

BACKGROUND

Remote data storage, such as cloud data storage, is becoming more and more popular, because it allows user client devices, which can usually store only a limited amount of data, to save data and files in one or more remote data storage servers that can be accessed either through the public internet or a dedicated private network connection. A data storage provider hosts, secures, manages, and maintains the data storage servers and the associated infrastructure and ensures the access of the user client devices to the data. One of the main advantages of cloud storage is that the user data may be recovered from the remote data storage servers when the data has been removed, corrupted, or otherwise becomes inaccessible on the user client device. However, as the user data that is transferred to the remote data storage servers becomes the responsibility of the data storage provider, security sensitive user data may potentially become accessible to the data storage provider, which may be undesirable for the user and/or conflict with legal regulations.

SUMMARY

It is an objective of the present disclosure to provide an improved client device and an improved data storage server for secure data storage of security sensitive data.

The foregoing and other objectives are achieved by the subject matter of the independent claims. Further implementation forms are apparent from the dependent claims, the description and the figures.

According to a first aspect, a client device comprising a processor is provided. The processor of the client device is configured to determine whether data to be stored in a database of a data storage server comprises security sensitive data to be stored in an encrypted data structure of one or more encrypted data structures of the database. In reaction to determining that the data to be stored in the database comprises security sensitive data, the client device is further configured to encrypt the security sensitive data with an encryption key. Moreover, the client device is configured to provide the data, including the encrypted security sensitive data, and an identifier of the encryption key to the data storage server for storing, based on the identifier of the encryption key, the security sensitive data in the encrypted data structure of the one or more encrypted data structures of the database. In other words, based on the identifier of the encryption key the remote data storage server is configured to determine where in the encrypted data structure to store the encrypted security sensitive data. The client device may be one of a plurality of client devices configured to store data on the remote storage server.

Thus, according to the first aspect, advantageously, the client device is provided with encryption functionality over security sensitive data, before the data is sent to the remote data storage server and stored in the database thereof. The data storage server is not exposed to the security sensitive data as well as encryption information that may jeopardize the security of the encrypted security sensitive data. The data storage server, however, is still able to store the encrypted security sensitive data in the database. The security sensitive data stored in the data storage server remains encrypted at all times, even during query processing. The client device is the only entity that can see and analyse the data. Moreover, different encrypted data structures of the database of the data storage server may be created and owned by the different client devices.

In a further possible implementation form of the first aspect, the database is a relational database and the encrypted data structure of the one or more encrypted data structures is an encrypted column of a table of the relational database. In an implementation form the encrypted column of the table of the relational database may comprise column elements encrypted using different encryption keys. For instance, a first column element may be encrypted with the encryption key of a first client device, while a second column element may be encrypted with the encryption key of a second client device. For the case of an encrypted column the data storage server is configured to determine based on the identifier of the encryption key the row of the encrypted column to store the encrypted security sensitive data.

In a further possible implementation form of the first aspect, the processor of the client device is further configured to encrypt the security sensitive data with the encryption key using a random encryption scheme or a deterministic encryption scheme.

In a further possible implementation form of the first aspect, the processor of the client device is further configured to execute an application, wherein the application is configured to generate the data to be stored in the database of the data storage server and to request storage of the data in the data storage server using a first type of data query comprising the data, wherein the processor of the client device is further configured to replace the security sensitive data in the first type of data query with the encrypted security sensitive data.

In a further possible implementation form of the first aspect, the processor of the client device is further configured to retrieve data from the database in response to a second type of data query from the application, wherein the data comprises encrypted security sensitive data stored in a further encrypted data structure of the one or more encrypted data structures, e.g. a further encrypted column of a table of the database, and to decrypt the encrypted security sensitive data with the encryption key.

In a further possible implementation form of the first aspect, the second type of data query comprises a query command for retrieving the data from the database, in particular relational database, wherein the data to be retrieved from the database, in particular relational database is identified by an argument of the query command and wherein the processor of the client device is further configured to encrypt the argument of the query command with the encryption key before providing the second type of data query to the remote data storage server.

In a further possible implementation form of the first aspect, the processor of the client device is further configured to identify the security sensitive data of the data to be retrieved from the relational database of the data storage server on the basis of at least one of a data type of the data and the identifier of the encryption key used for encrypting the data. In other words, in an implementation form the client device knows if the data is encrypted based on the data type of the row of the encrypted column. In the beginning of the response of the data, the data storage server may inform the client device about the data types of all of the columns of the table(s) of the relational database in the response. The content of each row of the encrypted column may also contain the encryption key identifier to be used for decrypting the respective row.

In a further possible implementation form of the first aspect, the client device further comprises a memory for storing database configuration information for identifying the one or more encrypted data structures, in particular the one or more encrypted columns of the database encrypted with a respective encryption key, wherein the processor of the client device is further configured to determine whether the data to be stored in the database comprises security sensitive data to be stored in the encrypted data structure of the one or more encrypted data structures, in particular the encrypted column of the database on the basis of the database configuration information. The database configuration information may be provided in the form of one or more metadata tables.

In a further possible implementation form of the first aspect, the memory is further configured to store the respective encryption key for encrypting the security sensitive data to be stored in the encrypted data structure of the one or more encrypted data structures, in particular an encrypted column of the database.

In a further possible implementation form of the first aspect, the processor of the client device is further configured to obtain the respective encryption key for encrypting the security sensitive data to be stored in the encrypted data structure of the one or more encrypted data structures, in particular the encrypted column of the database from the data storage server on the basis of the database configuration information.

In a further possible implementation form of the first aspect, the processor of the client device is further configured to obtain the respective encryption key in encrypted form from the data storage server, decrypt the respective encrypted encryption key with a client device master key, and to obtain the client device master key from a remote key management server.

In a further possible implementation form of the first aspect, the processor of the client device is further configured to extract the security sensitive data from the data to be stored in the database of the data storage server using a concrete syntax tree, i.e. a parse tree.

In a further possible implementation form of the first aspect, the processor of the client device is further configured to convert the security sensitive data from a human-readable format into a binary format, i.e. a binary or bit sequence and to encrypt the security sensitive data in the binary format with the respective encryption key for encrypting the security sensitive data to be stored in the encrypted data structure of the one or more encrypted data structures, in particular the encrypted column of the database.

In a further possible implementation form of the first aspect, the processor of the client device is further configured to convert the security sensitive data to be stored in and/or retrieved from the encrypted data structure of the one or more encrypted data structures of the database from a binary data type to a data type defined by a query.

According to a second aspect, a method for operating a client device is provided. The method comprises a step of determining whether data to be stored in a database of a data storage server comprises security sensitive data to be stored in an encrypted data structure of one or more encrypted data structures of the database. In reaction to determining that the data to be stored in the database comprises security sensitive data, the method further comprises the step of encrypting the security sensitive data with an encryption key. Moreover, the method comprises the step of providing the data, including the encrypted security sensitive data, and an identifier of the encryption key to the data storage server for storing, based on the identifier of the encryption key, the security sensitive data in the encrypted data structure of the one or more encrypted data structures of the database.

The method according to the second aspect of the present disclosure can be performed by the client device according to the first aspect of the present disclosure. Thus, further features of the method according to the second aspect of the present disclosure result directly from the functionality of the client device according to the first aspect of the present disclosure as well as its different implementation forms described above and below.

According to a third aspect, a data storage server for operating a database is provided. The data storage server comprises a processor configured to receive data, including encrypted security sensitive data encrypted with an encryption key, and an identifier of the encryption key from a client device, wherein the encrypted security sensitive data is to be stored in an encrypted data structure of one or more encrypted data structures of the database. Furthermore, the processor of the data storage server is configured to store, based on the identifier of the encryption key, the security sensitive data in the encrypted data structure of the one or more encrypted data structures of the database. In other words, based on the identifier of the encryption key the data storage server is configured to determine where in the encrypted data structure to store the encrypted security sensitive data.

In a further possible implementation form of the third aspect, the database is a relational database and the encrypted data structure of the one or more encrypted data structures is an encrypted column of a table of the relational database. In an implementation form the encrypted column of the table of the relational database may comprise column elements encrypted using different encryption keys. For instance, a first column element may be encrypted with the encryption key of a first client device, while a second column element may be encrypted with the encryption key of a second client device. For the case of an encrypted column the data storage server is configured to determine based on the identifier of the encryption key the row of the encrypted column to store the encrypted security sensitive data.

In a further possible implementation form of the third aspect, the processor of the data storage server is further configured to provide database configuration information to the client device, wherein the database configuration information allows the client device to identify the one or more encrypted data structures, in particular encrypted columns of tables of the relational database encrypted with a respective encryption key.

In a further possible implementation form of the third aspect, the database configuration information comprises a table comprising, for each encrypted column of the relational database, an identifier of the respective encryption key.

In a further possible implementation form of the third aspect, the processor of the data storage server is further configured to provide, in response to a data request query from the client device, data from the database to the client device, wherein the data comprises encrypted security sensitive data stored in an encrypted data structure of the one or more encrypted data structures, in particular an encrypted column of a table of the database.

In a further possible implementation form of the third aspect, the relational database is configured to store the security sensitive data in encrypted columns of one or more tables of the relational database encrypted with a respective encryption key using a binary data type.

According to a fourth aspect, a method of operating a data storage server having a database is provided. The method comprises the step of receiving data, including encrypted security sensitive data encrypted with an encryption key, and an identifier of the encryption key from a client device, wherein the encrypted security sensitive data is to be stored in an encrypted data structure of one or more encrypted data structures of the relational database. Moreover, the method comprises the step of storing, based on the identifier of the encryption key, the security sensitive data in the encrypted data structure of the one or more encrypted data structures of the database.

The method according to the fourth aspect of the present disclosure can be performed by the data storage server according to the third aspect of the present disclosure. Thus, further features of the method according to the fourth aspect of the present disclosure result directly from the functionality of the data storage server according to the third aspect of the present disclosure as well as its different implementation forms described above and below.

According to a fifth aspect, a computer program product comprising a non-transitory computer-readable storage medium for storing program code which causes a computer or a processor to perform the method according to the second aspect or the method according to the fourth aspect, when the program code is executed by the computer or the processor, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 1b illustrate an exemplary table used by a client device according to an embodiment and a data storage server according to an embodiment for storing security sensitive data;

FIG. 6 is a diagram illustrating a method for storing data of a client device in a database of a remote data storage server according to an embodiment.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, aspects of embodiments of the present disclosure or aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Figure 1A:
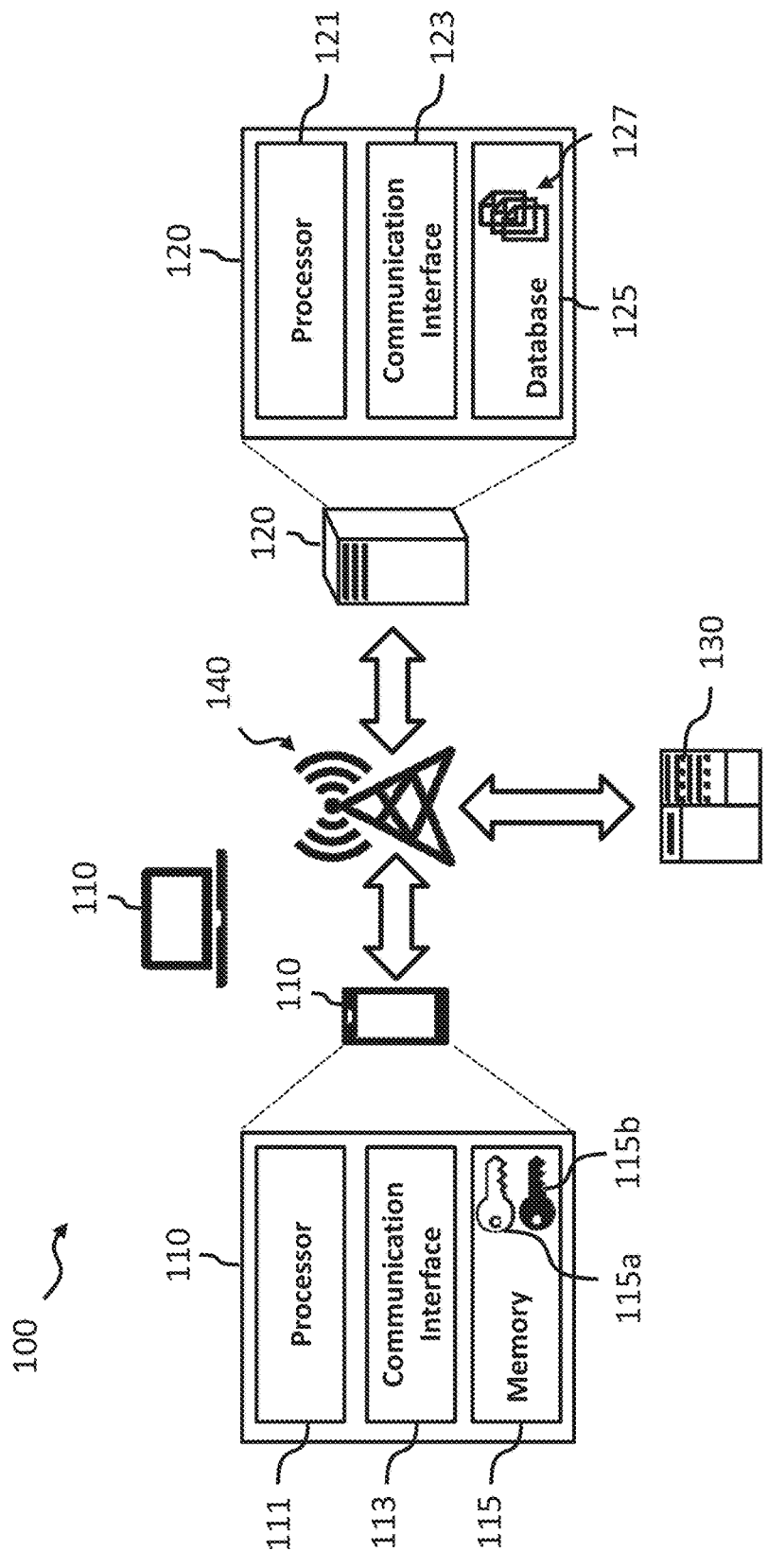
FIG. 1a is a schematic diagram illustrating a data storage system according to an embodiment, including a plurality of client devices according an embodiment and a data storage server operating a database according to an embodiment.

FIG. 1a is a schematic diagram illustrating a data, e.g. cloud storage system 100 according to an embodiment. As will be described in more detail below, the data storage system 100 comprises a plurality of client or user devices 110, such as smart phones, smart watches, tablet computers, laptop computers, desktop computers or other types of IoT devices, one or more remote data storage servers 120 operating a database 125 and a key management server 130. As illustrated in FIG. 1*a*, the plurality of client devices 110, the one or more remote data storage servers 120 and the key management server 130 may be configured to communicate with each other via a wireless, e.g. cellular and/or wired communication network 140. In an embodiment, the one or more remote data storage server 120 may be one or more cloud storage servers 120 configured to communicate with the client devices 110 via the Internet.

As illustrated in FIG. 1*a*, the client device 110 may comprise a processor 111 for processing and generating data, a communication interface 113, including, for instance, an antenna, for exchanging data with the other components of the cloud storage system 100, and a non-transitory memory 115 for storing data. The processor 111 of the client device 110 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The non-transitory memory 115 may store data, such as electronic keys and executable program code which, when executed by the processor 111, causes the client device 110 to perform the functions, operations and methods described herein. The communication interface 113 may comprise a wired or wireless communication interface 113. Likewise, the data storage server 120 may comprise a processor 121 for processing and generating data, a communication interface 123 for exchanging data with the other components of the data storage system 100 as well as the database 125 for storing data.

As will be described in more detail below, the client device 110 is configured to store data in the database 125 of the remote, e.g. cloud data storage server 120. The remote data storage server 120 is configured to store security sensitive data in an encrypted data structure of the database 125 encrypted with a respective encryption key. The client device 110 is configured to determine whether data to be stored in the database 125 of the data storage server 120 comprises security sensitive data by parsing the data to be stored in the relational database 125.

In the following detailed embodiments of the client device 110 and the data storage server 120 will be described, where the database 125 is implemented as a relational database 125, for instance, a SQL based relational database 125. In these embodiments, as will be described in more detail below the data storage server 120 is configured to store the security sensitive data in one or more encrypted columns of one or more tables of the relational database 125. As used herein, an encrypted column of a table of the relational database 125 is a column having column elements being encrypted with the same encryption key. FIG. 1*b* shows an example of a table 127 of the relational database 125 comprising two plaintext column 127*a* and 127*c* as well as one encrypted column 127*b* of security sensitive data.

It will be appreciated, however, that the data storage server 120 may comprise a non-relational database 125 and the client device 110 may be configured to operate therewith, wherein the security sensitive data are stored in an encrypted data structure other than an encrypted column of a table. For instance, in an embodiment, the database 125 may be implemented as a MongoDB database 125. For such an embodiment, the data storage server 120 may be configured to store the security sensitive data in one or more encrypted fields of the MongoDB database 125.

In an embodiment, database configuration information for identifying the rows and/or columns of the relational database 125 encrypted with a respective encryption key may be stored in the memory 115 of the client device 110. In an embodiment, the database configuration information may comprise one or more metadata tables. In an embodiment, such a metadata table could represent every encrypted row and/or column 127*b* of the relational database 125 using a first value, such as "1", while representing every non-encrypted row and/or column 127*a*, 127*c* of the relational database 125 with a second value different from the first value, such as "0". Alternatively or additionally, the database configuration information may comprise a list of the encrypted rows and/or columns of the relational database and their respective encryption keys. For instance, a first column element of a table of the relational database 125 may be encrypted with the encryption key of a first client device 110, while a second column element may be encrypted with the encryption key of a second client device 110. For the case of an encrypted column 127*b* the data storage server 120 is configured to determine based on the identifier of the encryption key the row of the encrypted column 127*b* to store the encrypted security sensitive data.

On the basis of the database configuration information the client device 110 is configured to identify the encrypted rows and/or columns 127*b* of the tables of the relational database 125 and, thus, to determine whether the data to be stored in the relational database 125 comprises security sensitive data to be stored in one of the encrypted rows and/or columns 127*b* of the table 127 of the relational database 125 identified by means of the database configuration information.

In an embodiment, the client device 101 may be configured to periodically poll the database configuration information from the remote data storage server 120. In case of changes of the relational database 125, such as new or changed encrypted rows and/or columns of the relational database 125, the data storage server 120 may be configured to provide an update of the database configuration information to the client device 110.

In an embodiment, the client device 110 is configured to parse the data to be stored in the relational database 125 of the data storage server 120 using a concrete syntax tree, i.e. a parse tree.

If the client device 110 determines that the data to be stored in the relational database 125 of the data storage server 120 comprises security sensitive data to be stored in an encrypted column 127*b* of the relational database 125, the client device 110 is further configured to encrypt the security sensitive data with an encryption key, such as the encryption key 115*b* illustrated in FIG. 1*a*, associated with the encrypted column 127*b* of the table 127 of the relational database 125. In an embodiment, the client device 101 may be configured to encrypt the security sensitive data with the encryption key 115*b* using a random encryption scheme (where the same plain text results in different cypher texts) or a deterministic random encryption scheme (where the same plain text results in the same cypher text).

Moreover, the client device 110 is configured to provide the data, including the encrypted security sensitive data, and an identifier of the encryption key 115*b* to the remote storage server 120. On the basis of the identifier of the encryption key 115*b*, the data storage server 120 is configured to identify the corresponding encrypted column 127*b* of the table 127 of the relational database 125 and to store the security sensitive data therein.

In an embodiment, the memory 115 of the client device 110 is configured to store the respective encryption key, such as the encryption key 115b, for encrypting the security sensitive data to be stored in the encrypted column 127b of the table 127 of the relational database 125 persistently. In another embodiment, the memory 115 of the client device 110 is configured to store the respective encryption key, such as the encryption key 115b, temporarily.

In an embodiment, the client device 110 is further configured to obtain the respective encryption key, such as the encryption key 115b, for encrypting the security sensitive data to be stored in the encrypted column 127b of the relational database 125 from the remote data storage server 120 on the basis of the database configuration information.

In another embodiment, the client device 110 is further configured to obtain the respective encryption key, such as the encryption key 115b, in encrypted form from the data storage server 120 and to decrypt the respective encrypted encryption key, such as the encryption key 115b, with a client device master key 115a. In an embodiment, the client device 110 is configured to obtain the client device master key 115a from the key management server 130. In an embodiment, the key management server 130 is operated by a trusted third party and configured to manage the client device master keys of all client devices 110 of the client storage system 100, including the client device master key 115a of the client device 110.

In an embodiment, the client device 110 is further configured to convert any security sensitive data to be stored in the relational database 125 from a human-readable format into a binary format and to encrypt the security sensitive data in the binary format with the respective encryption key 115b for encrypting the security sensitive data to be stored in the encrypted column 127b of the table 127 of the relational database 125. Likewise, for extracting the security sensitive data from the relational database 125 the client device 110 may be configured to reconvert (after decryption) the security sensitive data from the binary format into the human-readable format. In case the client device 110 requests the data in binary format, no format conversion may be necessary.

Complementary to the client device 110, the data storage server 120 is configured to store security sensitive data in encrypted columns of one or more tables, such as the encrypted column 127b of the table 127 shown in FIG. 1b, of the relational database 125 encrypted (by the client device(s) 110) with a respective encryption key, such as the encryption key 115b. The data storage server 120 is configured to receive data, including the encrypted security sensitive data encrypted with the encryption key 115b, and an identifier of the encryption key 115b from the client device 110 for storing the encrypted security sensitive data in an encrypted column of the relational database 125. As already described above, on the basis of the identifier of the encryption key 115b the data storage server 120 is configured to identify the corresponding encrypted column 127b of the relational database 125 and to store the security sensitive data therein. In an embodiment, the data storage server 120 is configured to implement a data definition language (DDL), which enables the management of encrypted rows and/or columns of the relational database 125, encryption keys, and client device master keys.

In an embodiment, the relational database 125 is configured to store the security sensitive data in encrypted columns of the relational database 125 encrypted with a respective encryption key using a binary data type. In an embodiment, the data storage server 120 is further configured to convert, in response to a data request query from the client device 110, the security sensitive data stored in encrypted rows and/or columns of the relational database 125 using the binary data type to a data type defined by the data request query. In an embodiment, the binary data type is the "bytea" data type defined in PostgreSQL. In an embodiment, the binary data type is an extension of the "bytea" data type, which in comparison to the "bytea" data type has an increased error checking of the inserted data and forbids certain types of operations on columns of this data type. For example, attempting to concatenate two encrypted strings of this data type by the data storage server may return an error message to the client device 110.

As already describe above, in an embodiment, the data storage server 120 is further configured to provide database configuration information to each of the client devices 110. The database configuration information allows each client device 110 identifying the columns of the relational database 125 encrypted with a respective encryption key, such as the encryption key 115b. In an embodiment, the database configuration information comprises a metadata table comprising for each encrypted column of the relational database 125 the identifier(s) of each of the respective encryption keys used for encrypting the data of the respective rows of the encrypted column of the relational database 125.

Figure 2:
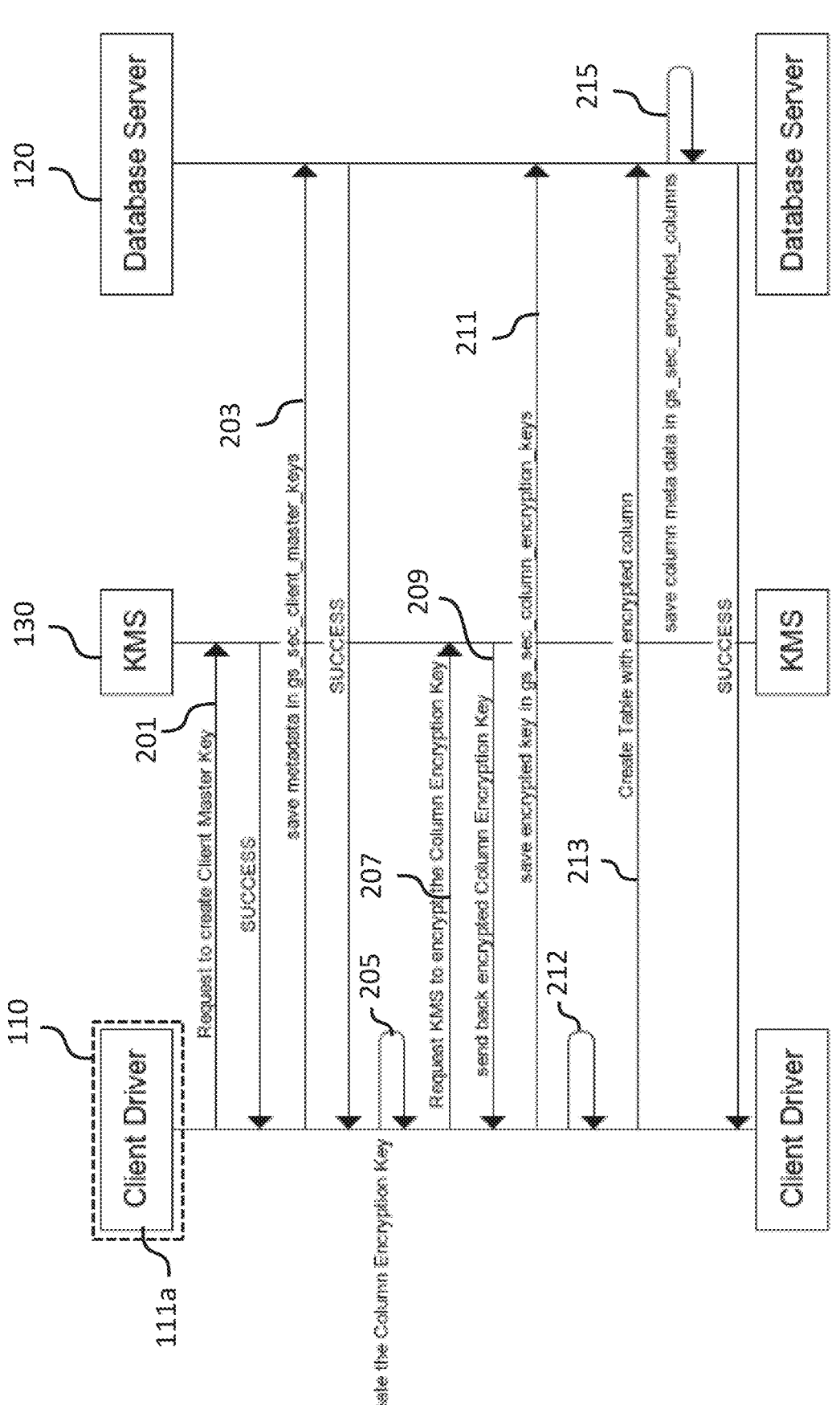
FIG. 2 is a sequence diagram illustrating interactions between a client device according to an embodiment, a data storage server according to an embodiment and a key management server for generating a column of encrypted data.

FIG. 2 illustrates an embodiment of the interactions between the client device 110, the remote data storage server (referred to as database server) 120, and the remote key management server (KMS) 130 in the process of creating an encrypted column, i.e. a column of encrypted data stored in the relational database 125 of the remote data storage server 120, including the following steps.

Step 201: A client driver 111a of the client device 110 (which may be a software executed by the processor 111 of the client device 110) sends a request to the KMS 130 to create a client master key 115a.

Step 203: If a client master key 115a has been successfully created, metadata is saved in the remote data storage server 120.

Step 205: The client driver 111a of the client device 110 generates a column encryption key 115b on the basis of the client master key 115a.

Step 207: The client driver 111a of the client device 110 requests the KMS 130 to encrypt the column encryption key 115b using the client master key 115a.

Step 209: The KMS 130 returns the encrypted column encryption key 115b back to the client device 110.

Step 211: The client driver 111a of the client device 110 sends the encrypted column encryption key 115b to the remote data storage server 120.

Step 212: The client driver 111a of the client device 110 creates a table with an encrypted column re-written to also include the data type to be used by the remote data storage server 120.

Step 213: The client driver 111a of the client device 110 instructs the remote data storage server 120 to create the table 127 with the encrypted column 127b of security sensitive data. For instance, a "CREATE TABLE" command may be send by the client driver 111a identifying two data types, namely the data type to be used by the remote data storage server 120 and the data type expected by a user querying the data.

Step 215: The remote data storage server 120 stores the configuration information (referred to as metadata in FIG. 2) and reports the successful operation to the client device 110.

Thus, as illustrated by FIG. 2, in an embodiment, the client device 110 may be configured to define the columns of the relational database 125 that store security sensitive data in encrypted form. This may happen, for instance, during table creation or when adding a new column to a table of the relational database 125. As already described above, the client device 110 may be configured to detect which columns of the relational database 125 accept only encrypted data during parsing of a new query including SQL statements for creating a table or adding a new column and to encrypt the data before it is sent to the data storage server 120.

Figure 3:
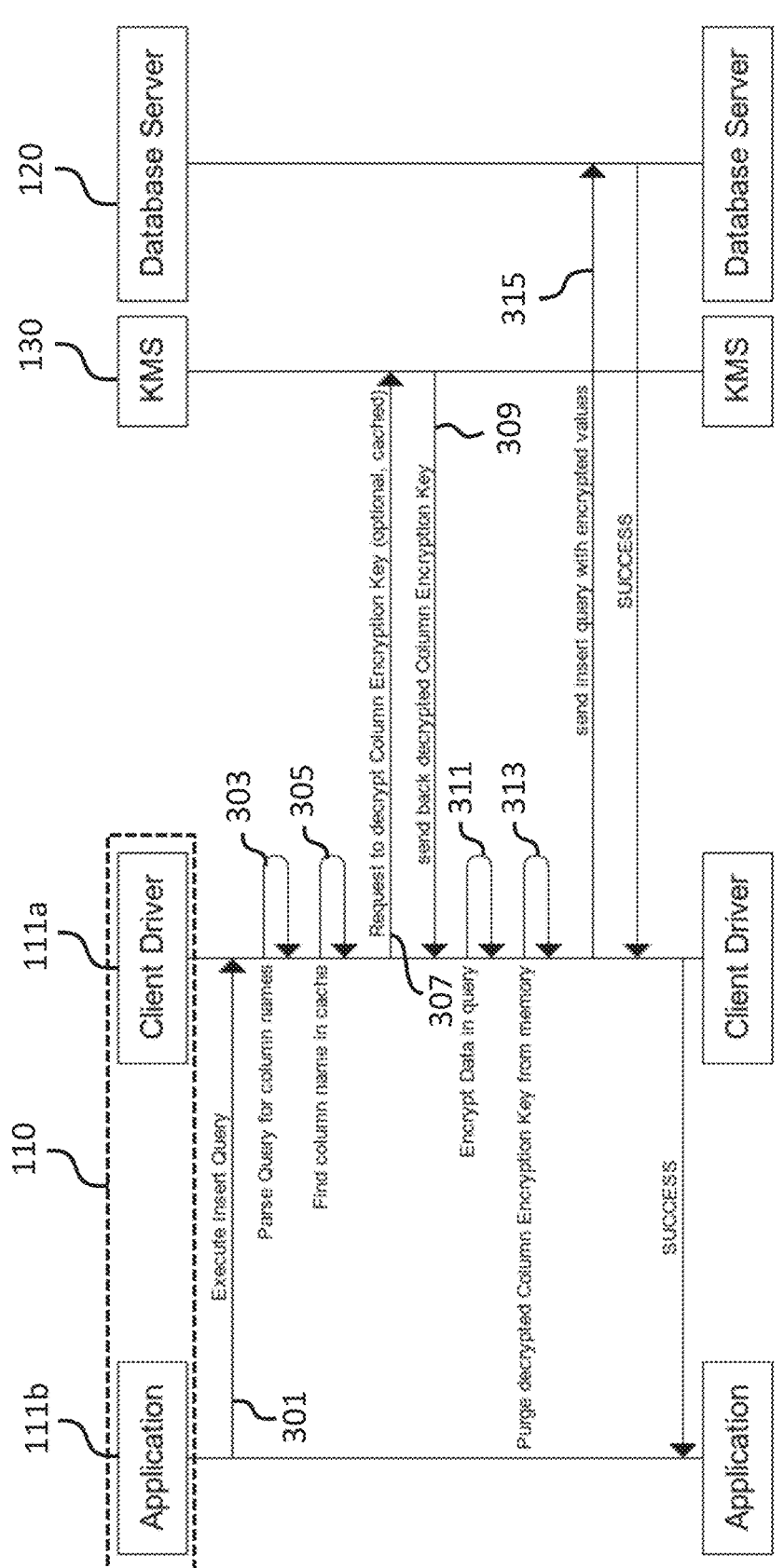
FIG. 3 is a sequence diagram illustrating interactions between a client device according to an embodiment, a data storage server according to an embodiment, and a key management server for adding data to a column of encrypted data.

FIG. 3 illustrates an embodiment of the interactions between the client device 110, the remote data storage server (referred to as database server) 120, and the remote key management server (KMS) 130 in the process of inserting security sensitive data 125a, i.e. to add security sensitive data in an already existing encrypted column, such as column 127b of table 127 shown in FIG. 1b, of the relational database 125 of the remote data storage server 120.

Step 301: An application 111b running on the client device 110 informs the client driver 111a to execute a query to insert further data in the relational database 125 of the remote data storage server 120.

Step 303: In response to step 301, the client driver 111a parses the query from the application 111b for the column names associated with the data to be stored in the relational database 125 of the remote data storage server 120.

Step 305: The client driver 111a identifies the column names stored in the memory 115 of the client device 110 on the basis of the parsed query.

Step 307: The client driver 111a of the client device 110 requests the KMS 130 to decrypt the respective encryption key 115b for each of the columns identified in step 305 of the relational database 125 storing encrypted security sensitive data. This step and the following step 309 may be omitted, if the respective encryption key(s) 115b is cached in the memory 115 of the client device 110.

Step 309: The KMS 130 returns the requested decrypted encryption key(s) 115b to the client device 110.

Step 311: The client driver 111a of the client device 110 encrypts the security sensitive data of the further data to be inserted into the relational database 125 using the encryption key(s) 115b.

Step 313: The client driver 111a of the client device 110 deletes the encryption key(s) 115b. According to a variant, the client driver 111a of the client device 110 may cache the encryption key(s) 115b in the memory 115 for future use.

Step 315: The client driver 111a of the client device 110 sends the further data, including the encrypted security sensitive data, along with one or more identifiers of the encryption key(s) 115b used by the client device 110 for encrypting the security sensitive data to the remote data storage server 120. On the basis of the one or more identifiers provided by the client device 110, the remote data storage server 120 stores the further data, including the encrypted security sensitive data, in the respective column(s) 127b of the relational database 125 identified by the one or more identifiers and reports this to the client device 110.

Thus, as illustrated in FIG. 3, in an embodiment, the application 111b of the client device 110 is configured to generate the data to be stored in the relational database 125 of the remote data storage server 120 and to request storage of the data in the remote data storage server 120 using a first type of data query comprising the data. In response to this query, the client device 110, more specifically the client driver 111a, is configured to replace the security sensitive data in the first type of data query with the encrypted security sensitive data.

Figure 4:
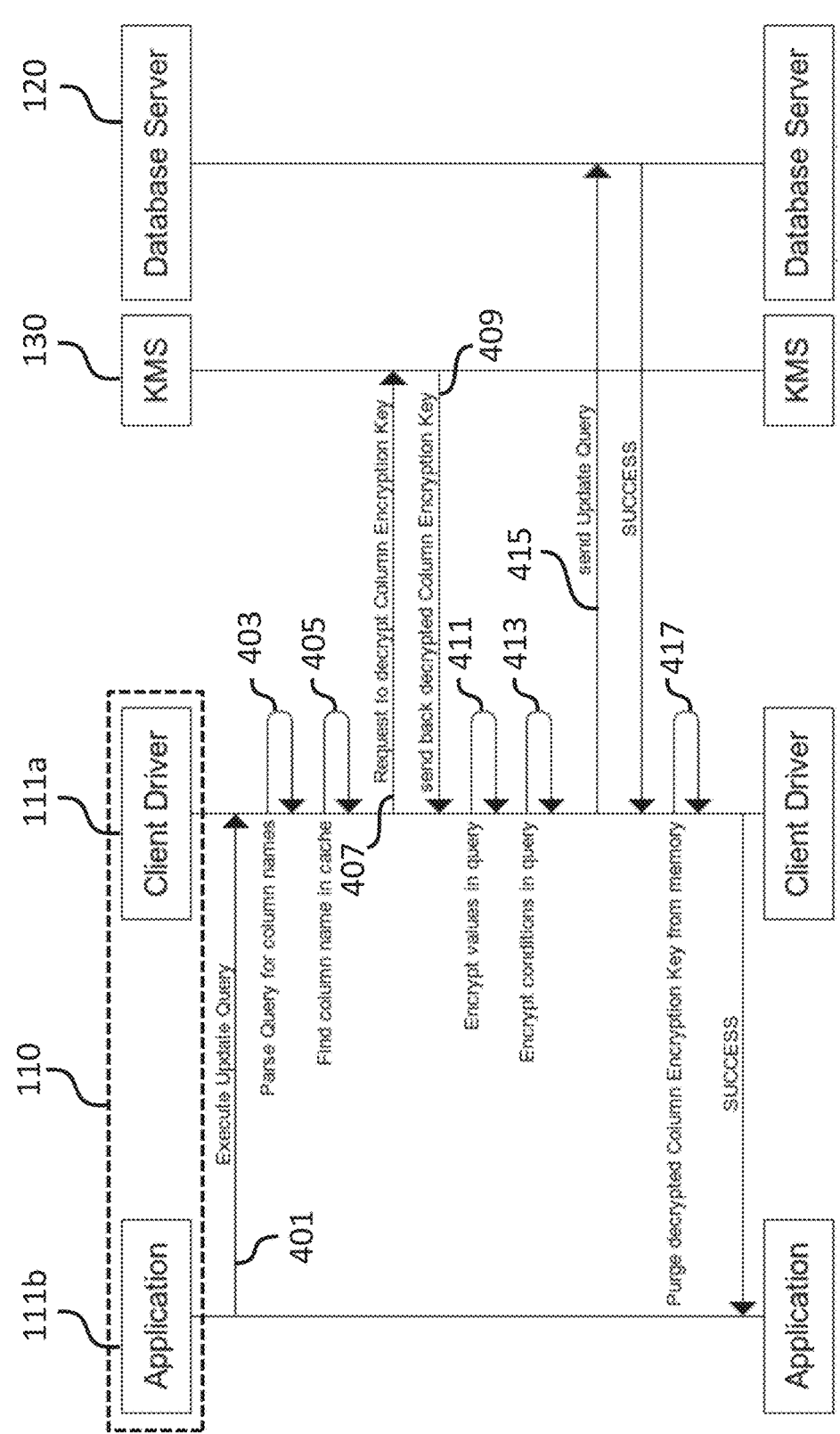
FIG. 4 is a sequence diagram illustrating interactions between a client device according to an embodiment, a data storage server according to an embodiment, and a key management server for updating data of a column of encrypted data.

FIG. 4 illustrates an embodiment of the interactions between the client device 110, the remote data storage server (referred to as database server) 120, and the remote key management server (KMS) 130 in the process of an updating query, i.e. in the process of replacing security sensitive data in the relational database 125 of the remote data storage server 120.

Step 401: The application 111b informs the client driver 111a to execute an update query for data in the relational database 125 of the remote data storage server 120.

Step 403: In response to step 401, the client driver 111a parses the update query from the application 111b for the column names associated with data to be updated in the relational database 125 of the remote data storage server 120.

Step 405: The client driver 111a identifies the column names stored in the memory 115 of the client device 110 on the basis of the parsed update query.

Step 407: The client driver 111a of the client device 110 requests the KMS 130 to decrypt the respective encryption key 115b for each of the columns identified in step 405 of the relational database 125 storing encrypted security sensitive data. This step and the following step 409 may be omitted, if the respective encryption key(s) 115b is cached in the memory 115 of the client device 110.

Step 409: The KMS 130 returns the requested decrypted encryption key(s) 115b to the client device 110.

Step 411: The client driver 111a of the client device 110 encrypts the values of the update query for updating the security sensitive data of the relational database 125 using the encryption key(s) 115b.

Step 413: The client driver 111a of the client device 110 encrypts the conditions of the update query for updating the security sensitive data of the relational database 125 using the encryption key(s) 115b.

Step 415: The client driver 111a of the client device 110 sends the update query, including the encrypted values and the encrypted conditions, along with one or more identifiers of the encryption key(s) 115b used by the client device 110 for encrypting the values and the conditions of the update query to the remote data storage server 120. On the basis of the one or more identifiers provided by the client device 110, the remote data storage server 120 updates the data, including the encrypted security sensitive data, in the respective column(s) of the relational database 125 identified by the one or more identifiers and reports this to the client device 110.

Step 417: The client driver 111a of the client device 110 deletes the encryption key(s) 115b. According to a variant, the client driver 111a of the client device 110 may cache the encryption key(s) 115b in the memory 115 for future use.

Figure 5:
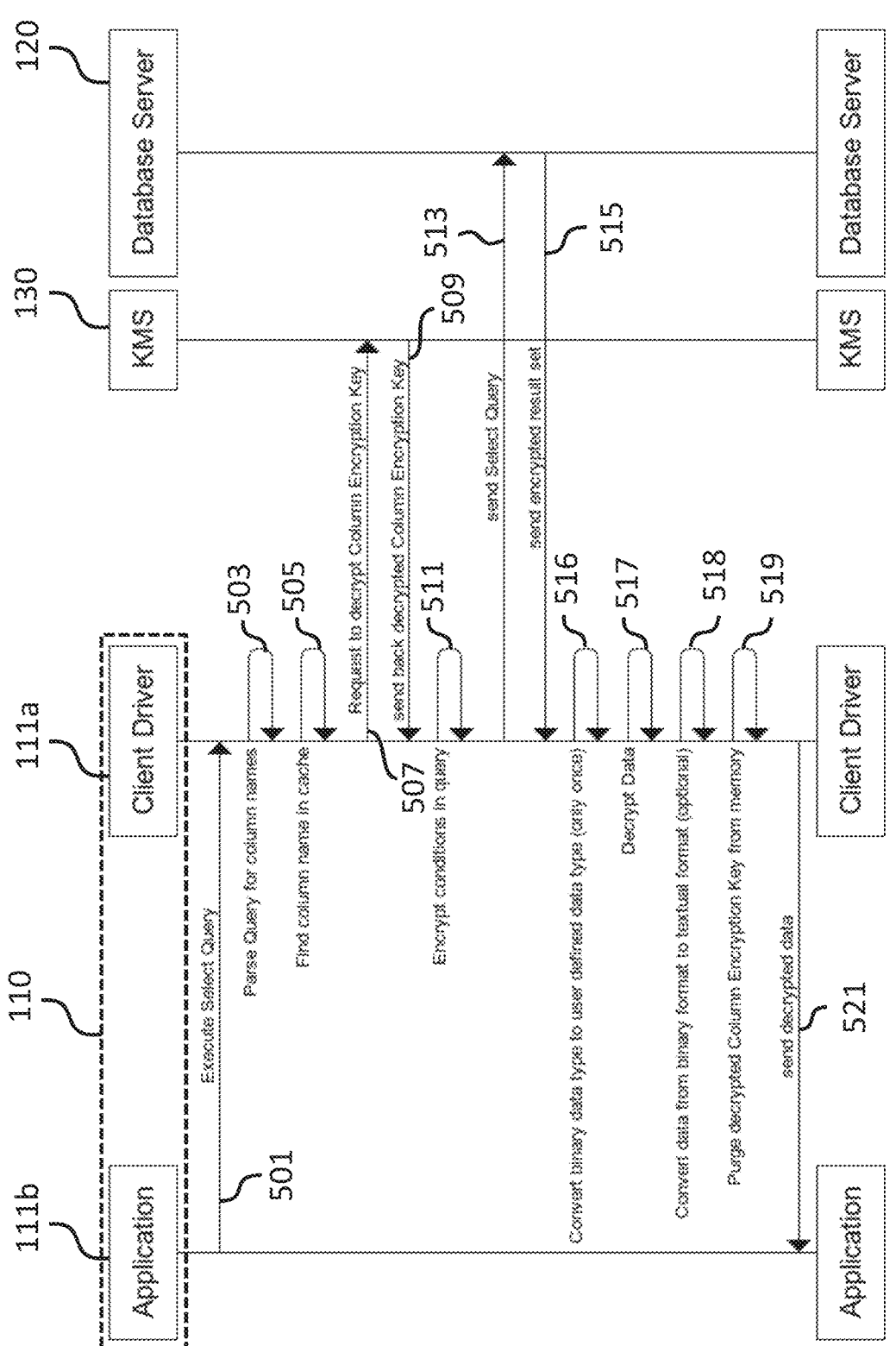
FIG. 5 is a sequence diagram illustrating interactions between a client device according to an embodiment, a data storage server according to an embodiment, and a key management server for extracting data from a column of encrypted data.

FIG. 5 illustrates an embodiment of the interactions between the client device 110, the remote data storage server (referred to as database server) 120, and the remote key management server (KMS) 130 in the process of extracting encrypted security sensitive data from the remote data storage server 120. By way of example, in the embodiment shown in FIG. 5, the extraction of data is illustrated in the context of a select query. Thus, in an embodiment, the data storage server 120 is further configured to provide, in response to a data request query from the client device 110, data from the relational database 125 to the client device 110, wherein the data comprises the encrypted security sensitive data stored in an encrypted column of the relational database 125, such as the encrypted column 127*b* of the table 127 shown in FIG. 1*b*.

Step 501: The application 111*b* informs the client driver 111*a* to execute a select query for extracting data from the relational database 125 of the remote data storage server 120.

Step 503: In response to step 501, the client driver 111*a* parses the select query from the application 111*b* for the column names associated with data to be extracted from the relational database 125 of the remote data storage server 120.

Step 505: The client driver 111*a* identifies the column names stored in the memory 115 of the client device 110 on the basis of the parsed select query.

Step 507: The client driver 111*a* of the client device 110 requests the KMS 130 to decrypt the respective encryption key 115*b* for each of the columns identified in step 505 of the relational database 125 storing encrypted security sensitive data. This step and the following step 509 may be omitted, if the respective encryption key(s) 115*b* is cached in the memory 115 of the client device 110.

Step 509: The KMS 130 returns the requested decrypted encryption key(s) 115*b* to the client device 110.

Step 511: The client driver 111*a* of the client device 110 encrypts the conditions of the select query using the encryption key(s) 115*b* for extracting the security sensitive data from the relational database 125.

Step 513: The client driver 111*a* of the client device 110 sends the select query, including the encrypted conditions, along with one or more identifiers of the encryption key(s) 115*b* used by the client device 110 for encrypting the conditions of the select query to the remote data storage server 120.

Step 515: On the basis of the one or more identifiers provided by the client device 110 in the previous step 513, the remote data storage server 120 extracts the encrypted security sensitive data from the respective column(s) of the relational database 125 identified by the one or more identifiers and sends the extracted encrypted security sensitive data to the client device 110.

Step 516: The client driver 111*a* of the client device 110 converts the data in a binary data type used by the relational database 125 to a data type used by the application 111*b*, such as a user-defined data type.

Step 517: The client driver 111*a* of the client device 110 using the respective encryption key(s) 115*b* decrypts the encrypted security sensitive data provided by the remote data storage server 120 in response to the select query (i.e. step 513).

Step 518: The client driver 111*a* of the client device converts the plaintext security sensitive data from a machine readable binary format into a human readable textual format.

Step 519: The client driver 111*a* of the client device 110 deletes the encryption key(s) 115*b*. According to a variant, the client driver 111*a* of the client device 110 may cache the encryption key(s) 115*b* in the memory 115 for future use.

Step 521: The client driver 111*a* of the client device 110 sends the decrypted security sensitive data to the application 111*b* of the client device 100 so that it can be used by the application 111*b*.

Thus, as illustrated by FIG. 5, in an embodiment, the client device 110 is further configured to retrieve data from the relational database 125 in response to a second type of data query from the application 111*b* and to decrypt the retrieved encrypted security sensitive data with the encryption key 115*b*. In an embodiment, the second type of data query may comprise a query command, such as a "SELECT" command, for retrieving the data from the relational database 125, wherein the data to be retrieved from the relational database 125 is identified by an argument of the query command, for instance, the "SELECT" command. In an embodiment, the client device 110 is further configured to encrypt the argument of the query command with the encryption key 115*b* before providing the second type of data query, e.g. the select data query to the remote data storage server 120.

FIG. 6 is a flow diagram of a method 600 for storing data of the client device 110 in the database 125, in particular relational database 125, of the remote data storage server 120. The method 600 comprises the following steps.

Step 601: determining, by the client device 110, whether data to be stored in the relational database 125 comprises security sensitive data to be stored in an encrypted data structure 127*b*, in particular an encrypted column 127*b* of the relational database 125.

Step 603: if the data to be stored in the relational database 125 comprises security sensitive data, encrypting, by the client device 110, the security sensitive data with an encryption key 115*b*.

Step 605: providing the data, including the encrypted security sensitive data, and an identifier of the encryption key 115*b* to the remote data storage server 120 for storing, based on the identifier of the encryption key (115*b*), the security sensitive data in the encrypted data structure 127*b*, in particular the encrypted column 127*b* of the relational database (125).

Figure 7:
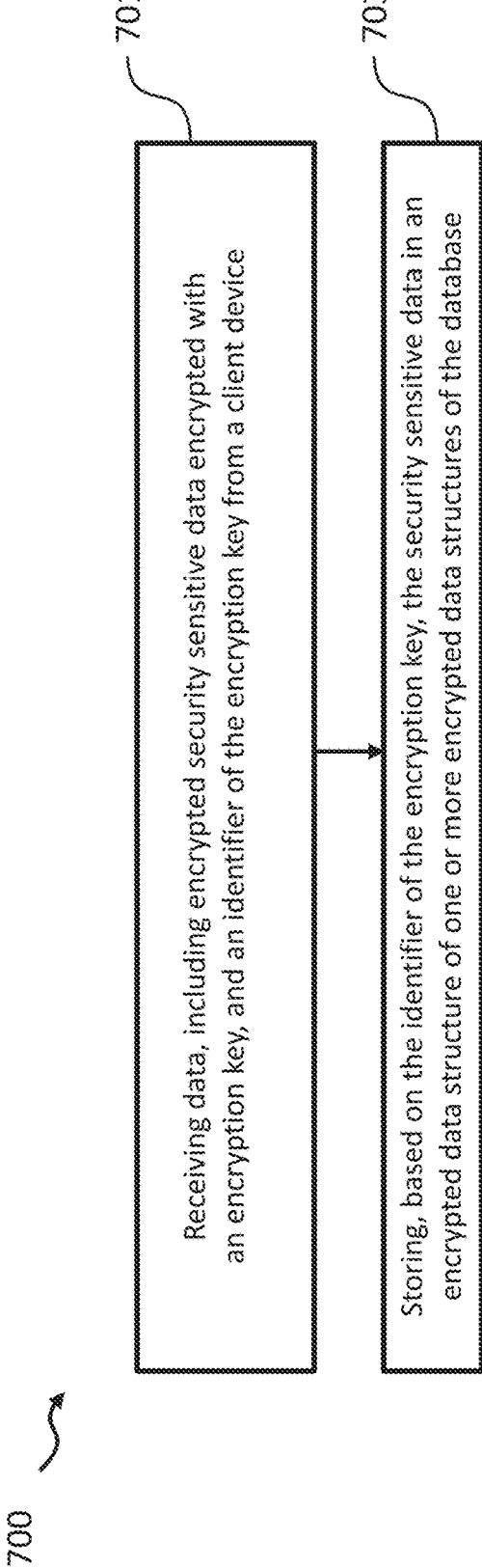
FIG. 7 is a diagram illustrating a method of operating a data storage server with a database according to an embodiment.

FIG. 7 is a flow diagram of a method 700 of operating the data storage server 120 with the database 125, in particular relational database 125. The method 700 comprises the following steps.

Step 701: receiving data, including encrypted security sensitive data encrypted with an encryption key 115*b*, and an identifier of the encryption key 115*b* from the client device 110, wherein the encrypted security sensitive data is to be stored in an encrypted data structure 127*b*, in particular an encrypted column 127*b* of the relational database 125.

Step 703: storing, based on the identifier of the encryption key 115*b*, the security sensitive data in the encrypted data structure 127*b*, in particular the encrypted column 127*b* of the relational database 125.

As already mentioned above, although the above embodiments have been described in the context of a relational database 125, in further embodiments, the data storage server 120 may comprise a non-relational database 125 and the client device 110 may be configured to operate therewith, wherein the security sensitive data are stored in an encrypted data structure other than an encrypted column of a table. For instance, in an embodiment, the database 125 may be implemented as a MongoDB database 125. For such an embodiment, the data storage server 120 may be configured to store the security sensitive data in one or more encrypted fields of the MongoDB database 125. When adding a new document, i.e. data to a collection (insert statement), the MongoDB client driver 111a may be configured to detect if a field in the document needs to be encrypted. The field data may be encrypted by the client driver 111a as required. When retrieving a document, i.e. data from a collection of the MongoDB database 125, a field encryption key identifier (equivalent to the column encryption key identifier described above) in the ciphertext may be used by the client driver 111a to determine which field encryption key to use to decrypt the ciphertext. This is similar to the column/row level encryption described above.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A method performed by a client device, the method comprising:
   receiving, from a data storage server, database configuration information identifying one or more encrypted data structures of a database of the data storage server, the one or more encrypted data structures being encrypted with one or more encryption keys;
   storing the received database configuration information;
   determining whether data to be stored in the database comprises security sensitive data to be stored in a respective encrypted data structure of the one or more encrypted data structures based on the received database configuration information;
   in response to determining that the data to be stored in the database comprises the security sensitive data, encrypting the security sensitive data with a respective encryption key of the one or more encryption keys; and providing the data to be stored in the database, including the encrypted security sensitive data, and an identifier of the respective encryption key to the data storage server for storing, based on the identifier of the respective encryption key, the security sensitive data to be stored in the respective encrypted data structure,
   wherein the database is a relational database, and the respective encrypted data structure is an encrypted column of a table of the relational database.

2. The method of claim 1, further comprising encrypting the security sensitive data with the respective encryption key using a random encryption scheme or a deterministic encryption scheme.

3. The method of claim 1, further comprising:
   executing an application, wherein the application is configured to generate the data to be stored in the database and to request, using a first type of data query comprising the data to be stored, storage of the data to be stored in the database in the data storage server, and
   replacing the security sensitive data in the first type of data query with the encrypted security sensitive data.

4. The method of claim 3, further comprising:
   retrieving further data from the database in response to a second type of data query from the application, wherein the further data comprises further encrypted security sensitive data stored in a further encrypted data structure of the one or more encrypted data structures; and
   decrypting the further encrypted security sensitive data with the respective encryption key.

5. The method of claim 4, wherein the second type of data query comprises a query command for retrieving the further data from the database, wherein the further data to be retrieved from the database is identified by an argument of the query command, the method further comprising encrypting the argument of the query command with the respective encryption key.

6. The method of claim 5, the method further comprising identifying the security sensitive data of the further data retrieved from the database of the data storage server based on at least one of a data type of the further data and the identifier of the respective encryption key.

7. The method of claim 1, further comprising storing the respective encryption key for encrypting the security sensitive data.

8. The method of claim 1, the method further comprising obtaining the respective encryption key for encrypting the security sensitive data from the data storage server based on the database configuration information.

9. The method of claim 8, further comprising:
   obtaining the respective encryption key in encrypted form from the data storage server;
   decrypting the respective encrypted encryption key with a client device master key; and
   obtaining the client device master key from a remote key management server.

10. The method of claim 1, further comprising extracting the security sensitive data from the data to be stored in the database of the data storage server using a syntax tree.

11. The method of claim 1, further comprising converting the security sensitive data from a human-readable format into a binary format; and
   encrypting the security sensitive data in the binary format with the respective encryption key.

12. The method of claim 1, further comprising converting the security sensitive data from a binary data type to a data type defined by a query.

13. The method of claim 1, wherein the database configuration information comprises a table comprising, for each encrypted column of the relational database, an identifier of an encryption key of the one or more encryption keys.

14. A computer program product comprising a non-transitory computer-readable storage medium having stored thereon processor executable instructions which, when executed by a processor, cause the processor to perform the method of claim 1.

15. A client device comprising processing circuitry configured to perform the method of claim 1.

16. A method for operating a data storage server comprising a database, the method comprising:

sending database configuration information to a client device, wherein the database configuration information allows the client device to identify one or more encrypted data structures of the database encrypted with one or more encryption keys;

receiving data, including encrypted security sensitive data encrypted with a respective encryption key, and an identifier of the respective encryption key from a client device, wherein the respective encryption key is one of the one or more encryption keys; and storing, based on the identifier of the respective encryption key, the security sensitive data in a respective encrypted data structure of the one or more encrypted data structures of the database, wherein the database is a relational database and the respective encrypted data structure of the one or more encrypted data structures is an encrypted column of a table of the relational database.

17. The method of claim 16, wherein the database configuration information comprises a table comprising, for each encrypted column of the relational database, an identifier of an encryption key of the one or more encryption keys.

18. The method of claim 16, further comprising providing, in response to a data request query from the client device, data from the database to the client device, wherein the data provided to the client device comprises encrypted security sensitive data stored in an encrypted data structure of the one or more encrypted data structures of the database.

19. The method of claim 18, further comprising storing the security sensitive data in the one or more encrypted data structures of the database, wherein the security sensitive data is encrypted with the respective encryption key using a binary data type.

20. The method of claim 16, wherein storing, based on the identifier of the respective encryption key, the security sensitive data in the respective encrypted data structure of the one or more encrypted data structures of the database comprises:

identifying, based on the identifier of the respective encryption key, the encrypted column of the table of the relational database, and storing, in the identified encrypted column of the table of the relational database, the security sensitive data.

21. A computer program product comprising a non-transitory computer-readable storage medium having stored thereon processor executable instructions which, when executed by a processor, cause the processor to perform the method of claim 16.

22. A data storage server comprising:

processing circuitry configured to perform the method of claim 16; and the database.

\* \* \* \* \*